United States Patent
Bourbon et al.

(10) Patent No.: US 7,682,596 B2
(45) Date of Patent: Mar. 23, 2010

(54) TITANIUM AND DENSE LITHIUM MIXED OXIDE POWDER COMPOUND, METHOD FOR PRODUCING SAID COMPOUND AND COMPOUND-CONTAINING ELECTRODE

(75) Inventors: Carole Bourbon, Saint-Michel de Saint-Geoirs (FR); Séverine Jouanneau, Saint Quentin sur Isère (FR); Frédéric Le Cras, Notre Dame de l'Osier (FR); Hélène Lignier, Saint Laurent du Pont (FR)

(73) Assignee: Commissariat à l'Energie Atomique, Paris (FR)

( * ) Notice: Subject to any disclaimer, the term of this patent is extended or adjusted under 35 U.S.C. 154(b) by 185 days.

(21) Appl. No.: 11/660,163

(22) PCT Filed: Aug. 8, 2005

(86) PCT No.: PCT/FR2005/002052

§ 371 (c)(1),
(2), (4) Date: Feb. 14, 2007

(87) PCT Pub. No.: WO2006/027449

PCT Pub. Date: Mar. 16, 2006

(65) Prior Publication Data

US 2008/0031798 A1  Feb. 7, 2008

(30) Foreign Application Priority Data

Aug. 31, 2004 (FR) .................... 04 09207

(51) Int. Cl.
- C01G 23/00 (2006.01)
- C01G 57/00 (2006.01)
- H01M 4/48 (2006.01)
- H01M 4/00 (2006.01)
- H01M 4/02 (2006.01)
- H01M 4/40 (2006.01)
- H01M 4/58 (2006.01)
- H01M 4/50 (2006.01)

(52) U.S. Cl. .................... 423/598; 423/331; 423/594.2; 423/594.5; 423/596; 423/592.1; 423/641; 429/27; 429/40; 429/231.951; 429/231.95; 429/223; 429/224

(58) Field of Classification Search .............. 423/592.1, 423/598, 641, 331, 594.2, 594.5, 596; 429/223, 429/224, 231.1, 27, 40, 231.95; H01M 4/50, H01M 4/00, 4/02, 4/40, 4/48, 4/58; C01G 23/00, C01G 57/00; C01D 15/00
See application file for complete search history.

(56) References Cited

U.S. PATENT DOCUMENTS

| 6,372,384 B1 * | 4/2002 | Fujimoto et al. ......... 429/231.1 |
| 2002/0102205 A1 * | 8/2002 | Amatucci ................... 423/598 |
| 2003/0017104 A1 | 1/2003 | Spitler et al. |
| 2003/0129496 A1 | 7/2003 | Kasai et al. |
| 2004/0110063 A1 * | 6/2004 | Uchitomi et al. ........... 429/223 |

FOREIGN PATENT DOCUMENTS

| EP | 1 057 783 A2 | 12/2000 |
| JP | A 2001-143702 | 5/2001 |
| JP | A 2002-211925 | 7/2002 |
| JP | A 2003-137547 | 5/2003 |

OTHER PUBLICATIONS

Birke, Solid State Ionic 1997, 93 (1-15).*

* cited by examiner

Primary Examiner—Melvin C Mayes
Assistant Examiner—Jun Li
(74) Attorney, Agent, or Firm—Oliff & Berridge, PLC

(57) ABSTRACT

A powdery compound selected from the group consisting of $Li_4Ti_5O_{12}$ and its derivatives selected from the group consisting of $Li_{4-x}M_xTi_5O_{12}$ and $Li_4Ti_{5-y}N_yO_{12}$ (x and y between 0 and 0.2, M and N selected from the group consisting of Na, K, Mg, Nb, Al, Ni , Co, Zr, Cr, Mn, Fe, Cu, Zn, Si and Mo), used as active material of an electrode for a lithium storage battery, consists of unitary particles having a diameter not greater than 1 μm and 10-50% volume agglomerated particles having a diameter not greater than 100 μm wherein the agglomerated particles formed by agglomeration of said unitary particles. The method for producing such a compound preferably consists in grinding the synthesized oxide for a duration comprised between 24 hours and 48 hours in a planetary mill and in then performing thermal treatment at a temperature comprised between 450° C. and 600° C.

14 Claims, 1 Drawing Sheet

TITANIUM AND DENSE LITHIUM MIXED OXIDE POWDER COMPOUND, METHOD FOR PRODUCING SAID COMPOUND AND COMPOUND-CONTAINING ELECTRODE

BACKGROUND OF THE INVENTION

The invention relates to a mixed titanium lithium oxide powdery compound, a method for producing one such compound and an electrode for an electrochemical energy storage system comprising one such compound.

STATE OF THE ART

Electrochemical energy storage systems comprise, among others, energy storage systems operating with lithium. Such systems then contain at least one electrode involving lithium. More particularly, systems called lithium storage batteries comprise two electrodes involving lithium. Hybrid systems also exist which only comprise a single electrode involving lithium.

Lithium storage batteries or lithium batteries are increasingly tending to replace rechargeable nickel-cadmium (Ni—Cd) or nickel-hydride (Ni-MH) storage batteries as autonomous energy source, in particular in portable items. Lithium storage batteries do in fact present better performances, and in particular a higher mass energy density, than those of Ni—Cd and Ni-MH storage batteries.

Lithium storage batteries are based on the principle of insertion and de-insertion of a $Li^+$ ion in the positive electrode. The positive electrode in fact contains at least one material able to insert a certain number of $Li^+$ cations in its structure. Thus, the materials used as active material of the positive electrode are generally chosen from $TiS_2$, $NbSe_3$, $V_2O_5$, $LiCoO_2$, $LiNiO_2$, $LiMn_2O_4$, $LiV_3O_8$ and, more recently, $LiFePO_4$. The negative electrode of such lithium storage batteries can be a $Li^+$ ion generator or also contain an active lithium intercalation material. Thus, the active material of the negative electrode is generally chosen from metallic lithium, a lithium alloy, a nanometric mixture of a lithium alloy in a lithium oxide, a lithium and transition metal nitride, a lithium intercalation or insertion material such as carbon in graphite form or a spinel-structure material comprising lithium and titanium $Li_{1+x}Ti_{(2-y)/4}O_4$, with x and y respectively comprised between 0 and 1 to achieve the active material of the negative electrode.

In the Patent Application JP2003137547, it was proposed to use a mixed titanium and lithium oxide $Li_4Ti_5O_{12}$ as active material of a positive or negative electrode of a secondary lithium storage battery. The $Li_4Ti_5O_{12}$ oxide is obtained by mixing precursors in water and then drying the mixture before treating it thermally at a temperature comprised between 700° C. and 1000° C. The mixture is then grinded so as to obtain a compound in powder form, with a homogeneous granulometric distribution, a mean diameter of the grains comprised between 0.5 and 1.5 µm and a maximum diameter of 25 µm. Although the $Li_4Ti_5O_{12}$ oxide thus produced enables a lithium storage battery presenting good power performances to be obtained, its density does not however exceed 0.85 g/ml. This low density does however present the drawback of forming bulky electrodes and therefore lithium storage batteries of large dimensions.

In the Patent Application US2003/0017104, the $Li_4Ti_5O_{12}$ oxide is synthesized so as to obtain a controlled and homogeneous particle diameter comprised between 5 nm and 2000 nm, with a specific surface comprised between 1 and 400 $m^2/g$. Synthesizing the oxide consists in grinding a mixed titanium and lithium oxide source in solution in water so as to obtain a predetermined grain diameter that is smaller than that required for the final oxide. Then the solution is dried by atomization and re-treated thermally, for example at a temperature comprised between 250° C. and 900° C. The drying and thermal treatment steps enable the diameter of the particles to be increased and a narrow granulometric distribution and a controlled specific surface to be obtained. After the thermal treatment step, the product can be re-dispersed in water to separate the agglomerates formed during thermal treatment.

OBJECT OF THE INVENTION

It is one object of the invention to obtain a mixed titanium lithium oxide powdery compound having both a high density and good electrochemical performances and preferably presenting low impurity and structural fault levels.

According to the invention, this object is achieved by the accompanying claims.

More particularly, this object is achieved by the fact that the powdery compound is formed by particles having a diameter less than or equal to 1 µm and by at least 10% by volume of grains having a diameter less than or equal to 100 µm and formed by agglomeration of said particles.

According to a first development of the invention, the proportion of the grains formed by agglomeration is comprised between 30% and 50% by volume with respect to the total volume of the compound.

According to a second development of the invention, the diameter of the particles is comprised between 0.1 µm and 0.5 µm.

It is a further object of the invention to provide a method for producing a mixed titanium lithium oxide powdery compound that is easy to implement and contributes to obtaining a dense compound without impairing the electrochemical performances of the compound.

According to the invention, this object is achieved by the fact that the method comprises at least the following successive steps:
  synthesizing a powdery mixed titanium lithium oxide,
  grinding the oxide for a duration comprised between 24 hours and 48 hours in a planetary mill to form particles having a diameter less than or equal to 1 µm and at least 10% by volume of grains having a diameter less than or equal to 100 µm, the grains being formed by agglomeration of said particles,
  thermal treatment at a temperature comprised between 450° C. and 600° C.

According to a development of the invention, the step of grinding the oxide is performed with less than 5% by volume of an organic solvent with respect to the total volume of mixed titanium lithium oxide.

According to another feature of the invention, the step of synthesizing the mixed titanium lithium oxide comprises at least:
  a grinding step of precursors of the mixed titanium lithium oxide for a duration comprised between 1 and 2 hours,
  a thermal treatment step with a temperature reaching 900° C.

It is a further object of the invention to obtain an electrode comprising a mixed titanium lithium oxide powdery compound and enabling an electrochemical energy storage system to be obtained providing good power performances and having a limited volume.

According to the invention, this object is achieved by the fact that the electrode comprises at least a powdery compound of mixed titanium lithium oxide constituted by particles having a diameter less than or equal to 1 µm and by at least 10% by volume of grains having a diameter less than or equal to 100 µm and formed by agglomeration of said particles.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
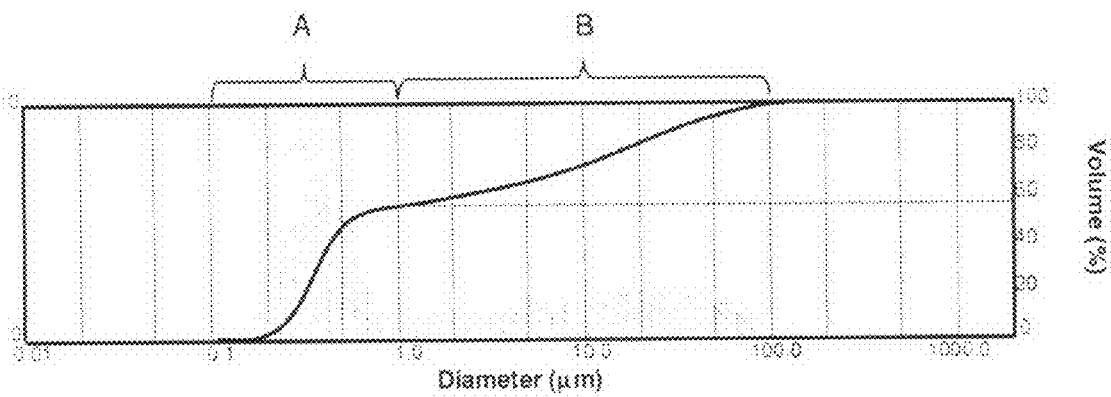
FIG. 1 represents the granulometric distribution of a powdery compound according to the invention obtained by laser granulometry.

According to the invention, a mixed titanium lithium oxide powdery compound, more particularly a compound having the empirical formula $Li_4Ti_5O_{12}$ or a derivative of $Li_4Ti_5O_{12}$ consists of:
  a first granulometric group formed by unitary particles of $Li_4Ti_5O_{12}$ or a derivative of $Li_4Ti_5O_{12}$,
  and a second granulometric group formed by grains formed by agglomeration of a certain number of said unitary particles.

Among the derivatives of $Li_4Ti_5O_{12}$, the powdery compound can for example be chosen from $Li_{(4-x)}M_xTi_5O_{12}$ and $Li_4Ti_{(5-y)}N_yO_{12}$, where x and y are respectively comprised between 0 and 0.2 and M and N are respectively chemical elements chosen from Na, K, Mg, Nb, Al, Ni, Co, Zr, Cr, Mn, Fe, Cu, Zn, Si and Mo.

What is meant by unitary particles are particles not bonded to one another, having a diameter less than or equal to 1 µm and preferably comprised between 0.1 µm and 0.5 µm. The grains formed by the agglomeration of unitary particles are also called agglomerated particles and they have a diameter less than or equal to 100 µm.

Moreover, the proportion of grains formed by agglomeration is at least 10% by volume with respect to the total volume of the powdery compound. Preferably, the proportion of grains is comprised between 30% and 50% by volume with respect to the total volume of the compound. The powdery compound of empirical formula $Li_4Ti_5O_{12}$ can thus for example comprise 60% by volume of unitary particles and 40% by volume of grains formed by agglomeration of said particles, so that each grain has a much larger diameter than the diameter of each particle.

Such a granulometric distribution enables a mixed titanium lithium oxide compound to be obtained having a high packed density, preferably greater than or equal to 1 g/cm³. Moreover, the specific surface measured according to the BET (Brunauer-Emmet-Teller) technique is preferably comprised between 5 and 30 m²/g and more particularly about 10 m²/g.

Such a powdery compound is preferably obtained by performing prior synthesis of the mixed titanium lithium oxide $Li_4Ti_5O_{12}$ or one of the derivatives thereof, by any type of known means, from precursors or reactants. For example, $Li_4Ti_5O_{12}$ is formed, by dry process, by making lithium carbonate ($Li_2CO_3$) react with titanium or rutile mixed oxide ($TiO_2$) according to the following reaction:

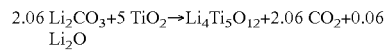

A slight excess of $Li_2CO_3$ is incorporated so as to counteract the evaporation of this reactant during the reaction.

Synthesis is performed by mixing the reactants thoroughly in a planetary mill with a solvent such as heptane during 1 to 2 hours. The mixture is then dried and disposed in an alumina crucible to undergo thermal treatment at a temperature reaching 900° C. The thermal treatment is preferably slow with for example a temperature increase rate of 1° C. to 3° C. per minute and two temperature hold plateaus comprised between 450° C. and 550° C. and between 650° C. and 700° C. during 10 to 20 hours. The mixture can then undergo an additional thermal treatment with a cooling rate of 0.5° C. to 2° C. per minute, after intermediate grinding if necessary. The synthesis step thus enables a pure and powdery mixed titanium lithium oxide $Li_4Ti_5O_{12}$ with a mean diameter generally larger than 1 µm and a narrow granulometric distribution to be obtained.

To obtain a derivative of $Li_4Ti_5O_{12}$ such as $Li_{(4-x)}M_xTi_5O_{12}$ or $Li_4Ti_{(5-y)}N_yO_{12}$, a precursor of the element M or of the element N is added to the reactants of the oxide before the thermal treatment.

The powdery mixed titanium lithium oxide is then placed in a planetary mill, also called centrifugal mill, to undergo intense grinding for a duration comprised between 24 and 48 hours. For example, a 250 ml agate bowl designed to be rotated at a speed of rotation of 400 rpm and comprising 10 balls with a diameter of 20 mm is used to grind 100 g of powdery compound. Grinding is preferably performed with less than 5% volume of an organic solvent, for example chosen from heptane and hexane. More particularly, it is performed dry, i.e. without using a solvent, which fosters formation of the agglomeration of unitary particles.

During this intense grinding step, the size of the $Li_4Ti_5O_{12}$ particles is reduced so as to obtain particles having a diameter smaller than or equal to 1 µm. In addition, certain particles are pressed against the edges of the bowl by the balls thus creating clusters of particles bonded to one another, when grinding has been completed. These clusters then form grains having a maximum diameter of 100 µm, in a proportion of at least 10% by volume with respect to the total volume of the compound.

The intense grinding step therefore enables a powdery compound comprising two distinct granulometric groups to be obtained, but it does induce stresses and structural defects in the powdery compound which may prove harmful in the lithium battery electrode application field and more particularly for the electrochemical performances of the compound.

To overcome this drawback, the powdery compound is placed in a quartz tube, in an inert atmosphere, for example argon. The quartz tube is then sealed and placed for 10 to 30 minutes in a furnace preheated to a lower temperature than the temperature of the thermal treatment performed when synthesis of the oxide was performed. More particularly, the furnace temperature is comprised between 450° C. and 600° C. and preferably 500° C. This thermal treatment step thus enables the stresses and defects generated in the mixed titanium lithium oxide crystals in the intense grinding step to be released.

Such a production method, while being easy to implement, enables a dense powdery compound to be obtained without impairing the electrochemical performances thereof. Indeed, such a method enables a compound presenting a particular granulometric distribution to be obtained, reducing a part of the volume occupied by the $Li_4Ti_5O_{12}$ crystals, by agglomeration, and thereby increasing the packed density of the compound. The compound moreover presents equivalent electrochemical performances to those of a $Li_4Ti_5O_{12}$ compound the granulometric distribution whereof is homogeneous and narrow, as the grains, formed by agglomeration, remain accessible to lithium intercalation.

Furthermore, the powdery compound advantageously presents an impurity ratio less than or equal to 1% per mole of titanium and low structural defect and stress ratios, thereby improving the electrochemical performances.

In a particular embodiment, the $Li_4Ti_5O_{12}$ oxide is synthesized by mixing 201.05 grams of $TiO_2$ with 76.11 grams of $Li_2CO_3$ in a planetary mill with heptane for 1 to 2 hours. The mixture obtained is then dried at 60° C. for 12 hours, and is then placed in a 250 ml alumina crucible. The crucible is then placed in a muffle furnace to synthesize the oxide by thermal treatment comprising the following steps:

a first temperature increase at a treatment rate of 2° C. per minute so as to reach a first plateau at a temperature of 500° C. maintained for 15 hours, a second temperature increase at a treatment rate of 2° C. per minute up to a second plateau at a temperature of 680° C. maintained for 15 hours, a third temperature increase at a treatment rate of 2° C. per minute up to a final plateau at a temperature of 900° C. maintained for 5 hours.

The powder obtained is then homogenized in the planetary mill, in heptane, for one hour, before undergoing an additional thermal treatment. The additional thermal treatment consists in a temperature increase up to 900° C., with a treatment rate of 5° C. per minute, the temperature then being maintained at 900° C. for 5 hours, and then reduced by 25° C. per minute until the ambient temperature is reached. 190 grams of $Li_4Ti_5O_{12}$ thus obtained are then mixed in a planetary mill for a duration of 24 hours to 48 hours, at the maximum speed delivered by the mill and more particularly at 400 rpm. Then 20 to 30 grams of the mixture are placed in an inert atmosphere in a quartz tube designed to undergo a thermal treatment for 15 minutes in a furnace previously heated to a temperature of 500° C. The tube is then removed from the furnace quickly to be cooled at ambient temperature.

Figure 2:
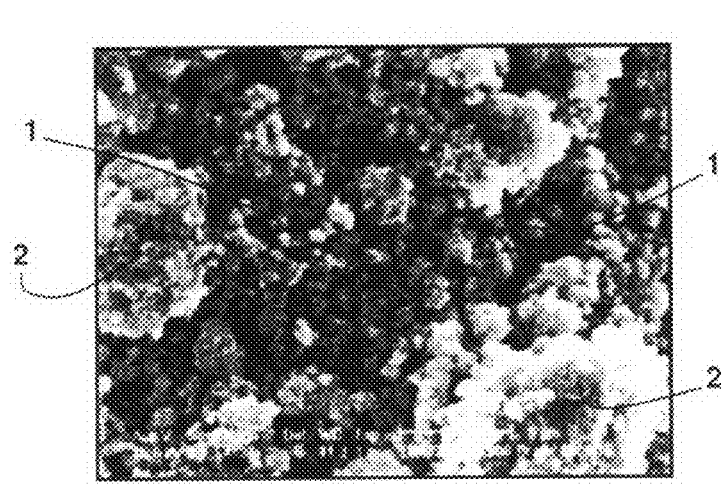
FIG. 2 represents a photo of a powdery compound according to the invention obtained by scanning electronic microscopy.

The powdery compound thus obtained presents a packed density of 1.4 g/cm³. Laser granulometry analysis, represented in FIG. 1, shows that the compound is mainly formed by two particle groups A and B. Group A presents a narrow granulometric distribution with a particle diameter comprised between 0.1 µm and 1 µm and a mean diameter of about 0.5 µm whereas group B has a wide granulometric distribution, between 1 µm and 100 µm. Moreover, the respective proportions of the groups A and B are about 60% and 40% by volume. Observation with a scanning electron microscope (SEM), illustrated by the image of FIG. 2, also confirms the particular morphology of the powdery compound, with two types of particles 1 and 2 of different sizes. The particles 1 represent the particles of group A with a diameter smaller than 1 µm, whereas the particles 2 represent the larger grains of group B. Moreover, the image of FIG. 2 shows that the grains 2 are formed by clusters of particles 1 obtained by agglomeration.

The density of the powdery compound thus obtained enables an electrode to be formed for a high-performance electrochemical energy storage system, such as a lithium battery, with a limited volume. An electrode can thus for example be formed by a nano-dispersion comprising at least the mixed titanium lithium oxide powdery compound with at least one conducting additive and/or a polymer binder. According to a particular embodiment, an electrode is made up of an aluminium current collector whereon a mixture comprising 80% in weight of a dense oxide $Li_4Ti_5O_{12}$, 8% in weight of a conducting additive, for example carbon black, and 12% in weight of a polymer organic binder, is deposited. The polymer organic binder is for example chosen from a polyether, a polyester or a methylmethacrylate-base, an acrylonitrile-base or a vinylidene fluoride-base polymer.

Such an electrode can for example be used as positive electrode in a lithium storage battery comprising, in addition, a negative electrode made from metallic lithium and a separator imbibed with liquid electrolyte. The liquid electrolyte can be formed by any type of liquid electrolyte known in the field of lithium storage batteries. It is for example formed by a lithium salt such as $LiClO_4$, $LiAsF_6$, $LiPF_6$, $LiBF_4$ or $LiCH_3SO_3$ dissolved in an aprotic solvent such as ethylene carbonate, propylene carbonate, dimethylcarbonate, diethylcarbonate and/or methylethylcarbonate.

A lithium storage battery comprising a positive electrode having as base the powdery compound $Li_4Ti_5O_{12}$, a metallic lithium electrode and a separator imbibed with a liquid electrolyte containing 1M of $LiFP_6$ in solution in propylene carbonate was thus tested. The positive electrode comprises an aluminium current collector whereon a mixture comprising 80% in weight of dense $Li_4Ti_5O_{12}$, 8% in weight of carbon black and 12% in weight of polyvinylidene hexafluoride was deposited. In this case, $Li_4Ti_5O_{12}$ acts as insertion and de-insertion material of the lithium coming from the negative electrode and enables three lithium ions to be exchanged, with a plateau at 1.55V with respect to the lithium.

Figure 3:
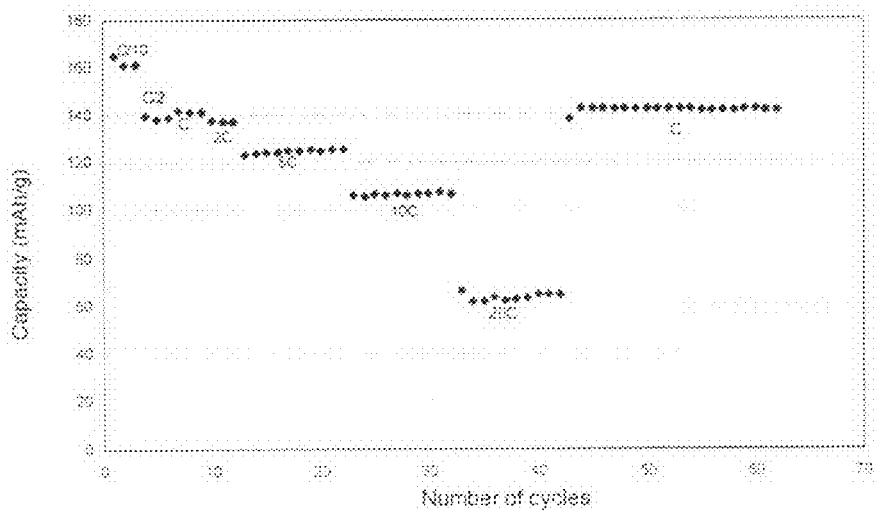
FIG. 3 represents the variation of the capacity of a lithium storage battery comprising a positive electrode whose base is formed by a powdery compound according to the invention versus the number of cycles, under different current conditions.

FIG. 3 illustrates the variation of the lithium storage battery capacity versus the number of cycles, under different current conditions C/N, where N is the number of hours per charging and per discharging of the battery, i.e. per insertion and de-insertion of the lithium in the $Li_4Ti_5O_{12}$ material. It can thus be observed:

that the smaller N is, the stronger the current and the faster the charging and discharging cycles are, that in weak conditions, for example C/10, the battery reaches a nominal capacity of 160 mAh/g, that, for all current conditions (from C/10 to 20C), the behaviour of the lithium battery is stable, that in strong conditions, for example at 20C, the lithium storage battery capacity is still about 60 mAh/g, i.e. 40% of the nominal capacity obtained under weak conditions.

This storage battery therefore presents excellent electrochemical properties and more particularly a high capacity both in low conditions (C/10) and in high conditions (20C). Moreover, as the nominal capacity is high, i.e. the capacity per gram of active material is high and the powdery compound presents a high density, the capacity per volume is also high.

The invention is not limited to the embodiments described above. For example, the powdery compound can also be used as active material in a negative electrode for a lithium storage battery. In this case, the positive electrode comprises an active material of any type known in the field of lithium storage batteries. The positive electrode can for example comprise $LiFePO_4$, $LiMn_2O_4$ or $LiNi_{0.5}Mn_{1.5}O_4$. For example, the lithium battery can comprise a negative electrode containing $Li_4Ti_5O_{12}$ according to the invention, a positive electrode containing $LiFePO_4$ and a separator imbibed with a liquid electrolyte formed by 1M of $LiPF_6$ in solution in propylene carbonate. The positive and negative electrodes are then placed in such a way as to have 3 $LiFePO_4$ facing 1 $Li_4Ti_5O_{12}$, to use 100% of the storage capacity of the active material of the negative electrode. Such a storage battery then operates at a potential of 1.9 V with respect to the lithium.

For a hybrid electrochemical energy storage system, the second electrode, the positive electrode, is for example formed by carbon with a high specific surface.

The invention claimed is:

1. A powdery compound selected from the group consisting of $Li_4Ti_5O_{12}$ and its derivatives which are selected from the group consisting of $Li_{4-x}M_xTi_5O_{12}$ and $Li_4Ti_{5-y}N_yO_{12}$ wherein x and y are between 0 and 0.2 while M and N are selected from the group consisting of Na, K, Mg, Nb, Al, Ni, Co, Zr, Cr, Mn, Fe, Cu, Zn, Si and Mo, consisting of two distinct granulometric groups
   a first group being unitary particles, not agglomerated, having a diameter less than or equal to 1 μm
   and a second group being grains formed by agglomeration of the unitary particles, each grain having a diameter less than or equal to 100 μm,
   wherein the second group comprises from 10% by volume to 50% by volume with respect to a total volume of the powdery compound, and the remainder of the volume of the powdery compound is the first group.

2. The compound according to claim 1, wherein the second group comprises between 30% and 50% by volume with respect to the total volume of the compound.

3. The compound according to claim 1, wherein the diameter of the first group is between 0.1 μm and 0.51 μm.

4. The compound according to claim 1, wherein the compound has an impurity ratio of less than or equal to 1% per mole of titanium.

5. The compound according to claim 1, presenting a packed density greater than or equal to 1 g/cm³.

6. The compound according to claim 1, presenting a specific surface value between 5 and 30 m²/g.

7. A method for producing the powdery compound selected from the group consisting of $Li_4Ti_5O_{12}$ and its derivatives which are selected from the group consisting of $Li_{4-x}M_xTi_5O_{12}$ and $Li_4Ti_{5-y}N_yO_{12}$ wherein x and y are between 0 and 0.2 while M and N are selected from the group consisting of Na, K, Mg, Nb, Al, Ni, Co, Zr, Cr, Mn, Fe, Cu, Zn, Si and Mo according to claim 1, comprising
   synthesizing a powdery mixed titanium lithium oxide,
   grinding the oxide for a duration comprised between 24 hours and 48 hours in a planetary mill to form unitary particles having a diameter less than or equal to 1 μm and at least 10% by volume of grains having a diameter less than or equal to 100 μm, the grains being formed by agglomeration of said unitary particles, and
   thermally treating the particles at a temperature of between 450° C. and 600° C. to form said powdery compound.

8. The method according to claim 7, wherein the oxide grinding step is performed with less than 5% by volume of an organic solvent with respect to the total volume of mixed titanium lithium oxide.

9. The method according to claim 7, wherein the step of synthesizing the mixed titanium lithium oxide comprises
   a grinding step of precursors of the mixed titanium lithium oxide for a duration comprised between 1 and 2 hours, and
   a thermal treatment step with a temperature reaching 900° C.

10. The method according to claim 9, wherein the precursors of mixed titanium lithium oxide are $TiO_2$ and $Li_2CO_3$.

11. The method according to claim 9, wherein a precursor of a chemical element selected from the group consisting of Na, K, Mg, Nb, Al, Ni, Co, Zr, Cr, Mn, Fe, Cu, Zn, Si and Mo is added to the precursors of mixed titanium lithium oxide during the grinding step.

12. An electrode for an electrochemical energy storage system, comprising at least a powdery compound of mixed titanium lithium oxide according to claim 1.

13. The electrode according to claim 12, consisting of a nano-dispersion of the powdery compound with at least a conducting additive and/or a polymer binder.

14. The compound according to claim 1, wherein the compound has a spinel structure.

* * * * *